(12) United States Patent
Durand et al.

(10) Patent No.: US 10,302,016 B2
(45) Date of Patent: May 28, 2019

(54) SUPPORT PROVIDING A COMPLETE CONNECTION BETWEEN A TURBINE SHAFT AND A DEGASSING PIPE OF A TURBOJET

(71) Applicant: Safran Aircraft Engines, Paris (FR)

(72) Inventors: Noel Didier Durand, Moissy-Cramayel (FR); Daniel Nicolas Delaporte, Moissy-Cramayel (FR); Emmanuel Linquette, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 84 days.

(21) Appl. No.: 15/803,271

(22) Filed: Nov. 3, 2017

(65) Prior Publication Data

US 2018/0128180 A1 May 10, 2018

(51) Int. Cl.
| | | |
|---|---|---|
| *F02C 7/20* | (2006.01) | |
| *F01D 25/22* | (2006.01) | |
| *F16J 15/3272* | (2016.01) | |
| *F16L 37/14* | (2006.01) | |
| *F01D 5/02* | (2006.01) | |
| *F01D 25/18* | (2006.01) | |

(52) U.S. Cl.
CPC ............... *F02C 7/20* (2013.01); *F01D 5/026* (2013.01); *F01D 25/18* (2013.01); *F01D 25/22* (2013.01); *F16J 15/3272* (2013.01); *F16L 37/144* (2013.01); *F05D 2230/64* (2013.01); *F05D 2230/642* (2013.01); *F05D 2240/61* (2013.01); *F05D 2260/609* (2013.01)

(58) Field of Classification Search
CPC . F02C 7/20; F01D 5/026; F01D 25/18; F01D 25/22; F16L 15/3272; F16L 37/144; F05D 2230/64; F05D 2230/642; F05D 2240/61; F05D 2260/609
See application file for complete search history.

(56) References Cited

FOREIGN PATENT DOCUMENTS

| | | |
|---|---|---|
| FR | 2957974 A1 | 9/2011 |
| FR | 3008135 A1 | 1/2015 |
| WO | 02/44538 A2 | 6/2002 |
| WO | 2016/121193 A1 | 8/2016 |

OTHER PUBLICATIONS

Preliminary Research Report received for French Application No. 1660752, dated Jul. 10, 2017, 3 pages (1 page of French Translation Cover Sheet and 2 pages of original document).

*Primary Examiner* — Hieu T Vo
(74) *Attorney, Agent, or Firm* — Womble Bond Dickinson (US) LLP

(57) ABSTRACT

The invention relates to a support providing a complete connection between a degassing pipe (3) and a turbine shaft (2), said support including a plurality of outer contact spans (41*a*) intended to bear on the inner walls of the turbine shaft to secure the degassing pipe with respect thereto, characterized in that the different spans are each bordered by at least one elastomer insert (41*g*) which contributes to the protection of the turbine shaft during insertion of the support therein.

11 Claims, 4 Drawing Sheets

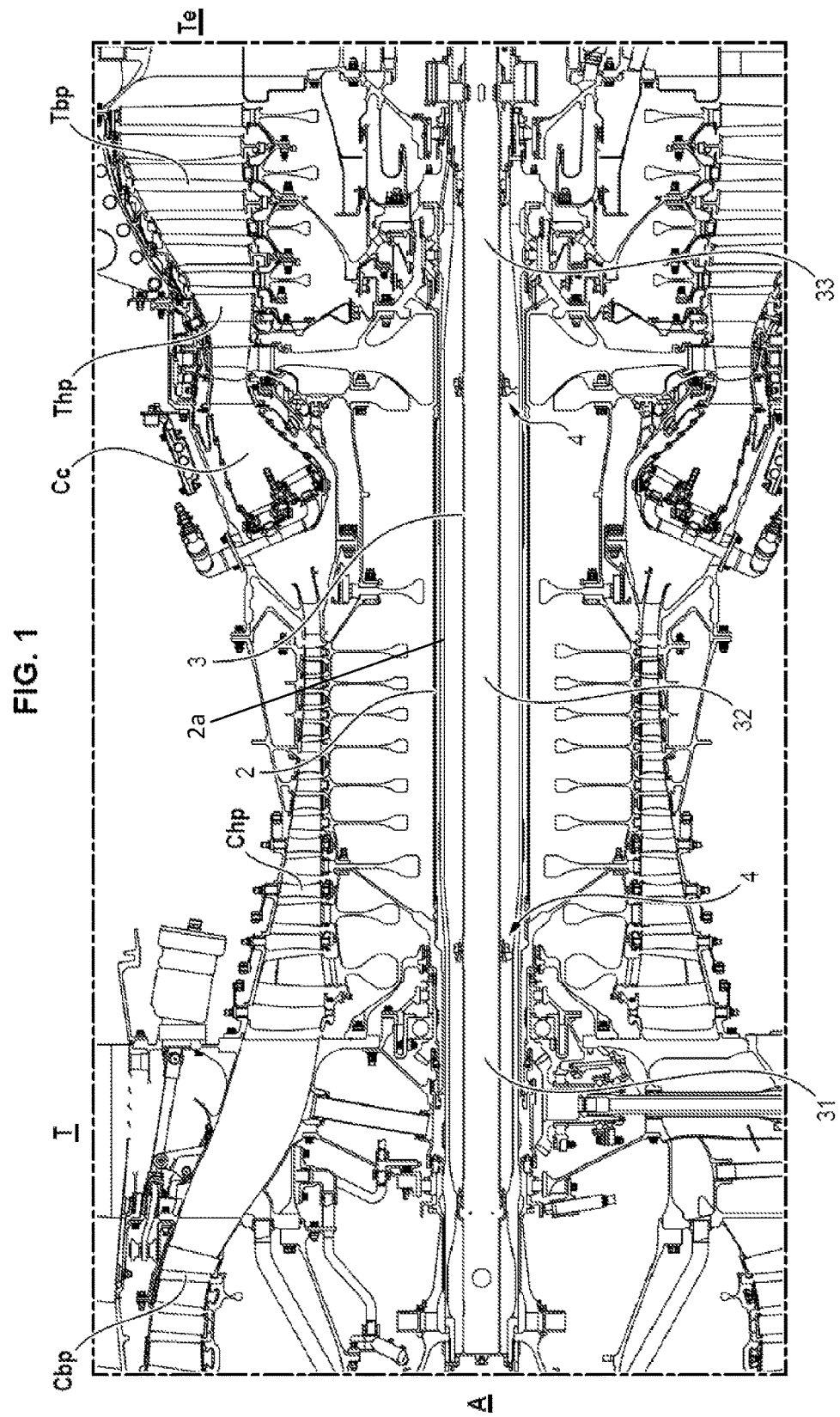

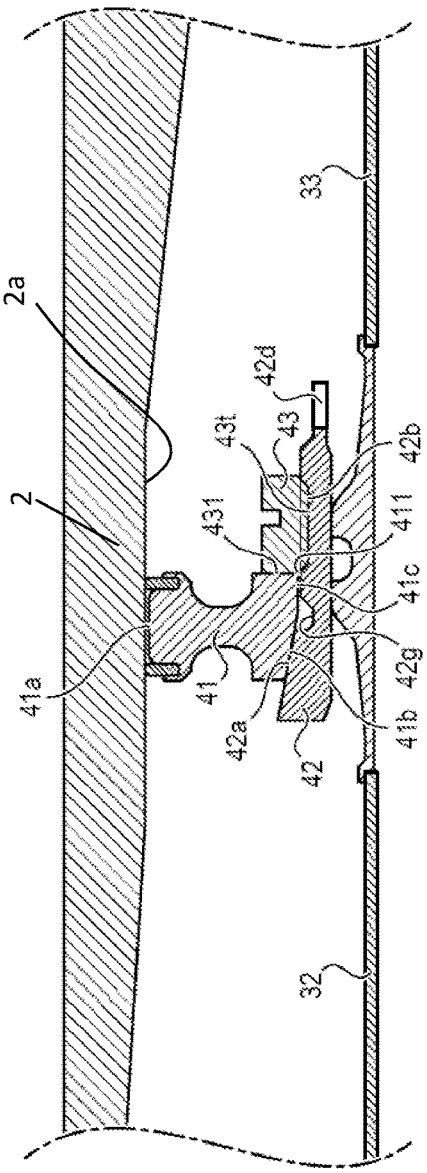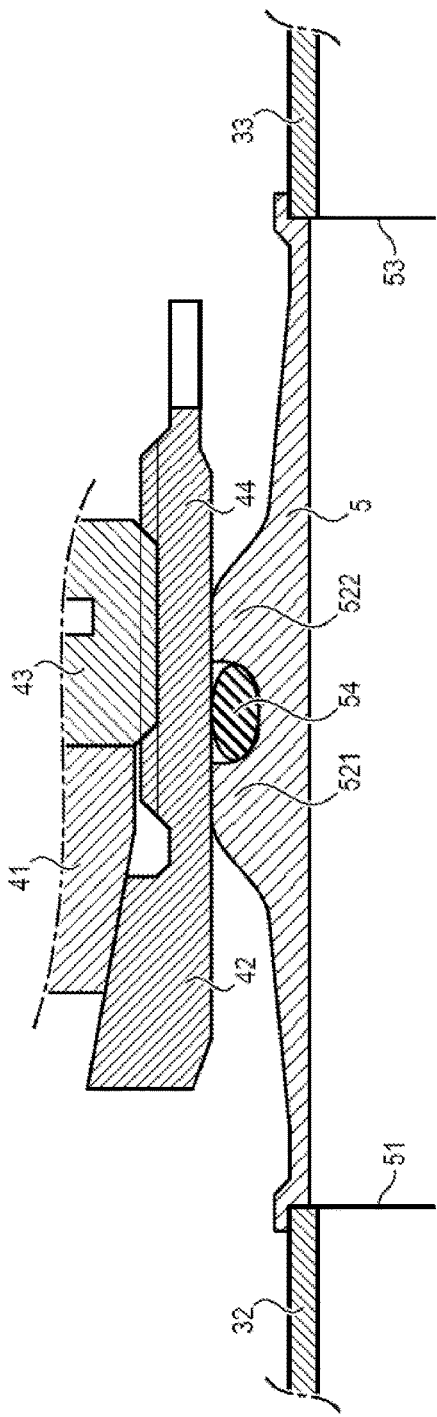

SUPPORT PROVIDING A COMPLETE CONNECTION BETWEEN A TURBINE SHAFT AND A DEGASSING PIPE OF A TURBOJET

GENERAL TECHNICAL FIELD AND PRIOR ART

The invention relates to a support providing a complete connection between a turbine shaft and a degassing pipe of a turbojet.

The function of lubricating the rolling elements of a turbojet is conventionally provided by an atmosphere including oil droplets in the compartments containing these rolling elements. In order to provide ventilation for them, a gas flow passes through these compartments and then passes through oil separators, the function whereof is to separate the oil from the gasses. The oils are captured by centrifugal effect to then be re-injected into the compartments of the rolling elements.

The gas flow is discharged via a degassing pipe. This is situated within the turbine shaft, concentrically with it. It is connected thereto by one or more insertion connections.

One example of a coupling is for example proposed in patent application FR 2 957 974, in the case of a turbine shaft with a constant inner diameter.

In certain turbine engines, the inner diameter of the turbine shaft is changing. Insertion is then provided by two central support systems. The coupling elements are placed in such a manner that they divide the degassing pipe into three portions, thereby reducing the length of the span.

Typically, these central support systems consist of a split support, a conical threaded socket and a nut. They are mounted blindly in the turbine shaft and put into position before installing the degassing pipe there. The coupling is then accomplished by expansion of the split support via the thrust of the nut screwed toward the conical surface, inducing an increase in the outer diameter of the support to obtain a tight fit between the support and the turbine shaft.

During the installation of the support systems, it happens that scratches occur on the inner surface of the turbine shaft. The wear caused by the operating conditions of the turbine shaft bring cause cracks to form on these scratches. This deterioration of the structure of the turbine shaft may cause it to rupture.

GENERAL PRESENTATION OF THE INVENTION

A general aim of the invention is to mitigate the disadvantages of the support systems of the prior art.

In particular, one of the aims of the invention is to prevent the deterioration of the turbine shaft following scratches.

Another aim of the invention is to facilitate the assembly of the support systems in the turbine shaft, thus reducing the duration and incidentally the cost of operations.

Another aim is to facilitate the disassembly of the systems, thus reducing the risks of deterioration during maintenance operations.

According to one aspect, the invention proposes a split support providing a complete connection between a degassing pipe and a turbine shaft, said support including a plurality of outer contact spans intended to bear on the inner walls of the turbine shaft to secure the degassing pipe with respect thereto, characterized in that the different spans are each bordered by at least one elastomer insert which contributes to the protection of the turbine shaft during insertion of the support therein.

"Bordered" will be understood to mean that an elastomer insert extends along the upstream and downstream edges of the different spans, upstream and downstream being defined in the flow direction of gases in the turbine engine.

In this manner, the risks of metal/metal contact between the turbine shaft and the split support are limited.

Such a support is advantageously completed by the following different features, taken alone or in combination:

It includes a plurality of lateral extra thicknesses which extend on either side of the outer contact spans and at which are disposed elastomer inserts.

It includes a plurality of dimples formed in the lateral extra thicknesses, said dimples being intended to receive the elastomer inserts. The dimples thus provide axial and tangential wedging of the elastomer inserts.

The contact spans which it comprises extend tangentially to a first virtual cylinder, the outer edges of the dimples extend along a second virtual cylinder concentric with the first and with a smaller radius. In this manner, the dimple edges do not cause the additional risk of contact between the support and the turbine shaft during the inclination or the righting of the support during assembly or disassembly of the latter.

The elastomer inserts may be assembled glued into the dimples. This option allows the inserts to be held in the correct position during the different phases of assembly or disassembly of the support systems.

The elastomer inserts may be assembled tightly into the dimples. This option also allows the inserts to be held in the correct position during the different phases of assembly or disassembly of the support systems.

The invention also proposes a support system providing a complete connection between a degassing pipe and a turbine shaft, said support system comprising such a support, a nut intended to exert an axial thrust force on said support by screwing onto the threaded portion of a conical socket, said socket having a conical portion intended to transform the axial thrust into radial expansion of said support.

It further proposes a degassing pipe and turbine shaft assembly secured thanks to a support system comprising such a support.

It also relates to a turbine engine including a degassing pipe and turbine shaft assembly secured by a support system including such a support, and more precisely a turbine engine including a shaft with a changing inner diameter secured to a concentric nominally cylindrical inner part with a support system including such a support.

PRESENTATION OF THE FIGURES

Other features and advantages of the invention will also be revealed by the description that follows, which is purely illustrative and not limiting, and must be read with reference to the appended figures in which:

FIG. 1 shows a partial section view of a known turbojet of the prior art;

FIG. 2 shows a section view of the central support systems and their positions with respect to the turbine shaft and to the degassing pipe;

FIG. 3 shows a partial section view of the degassing pipe and of a central support;

DESCRIPTION OF ONE OR MORE IMPLEMENTATION MODALITIES AND EMBODIMENTS

General

Figure 4:
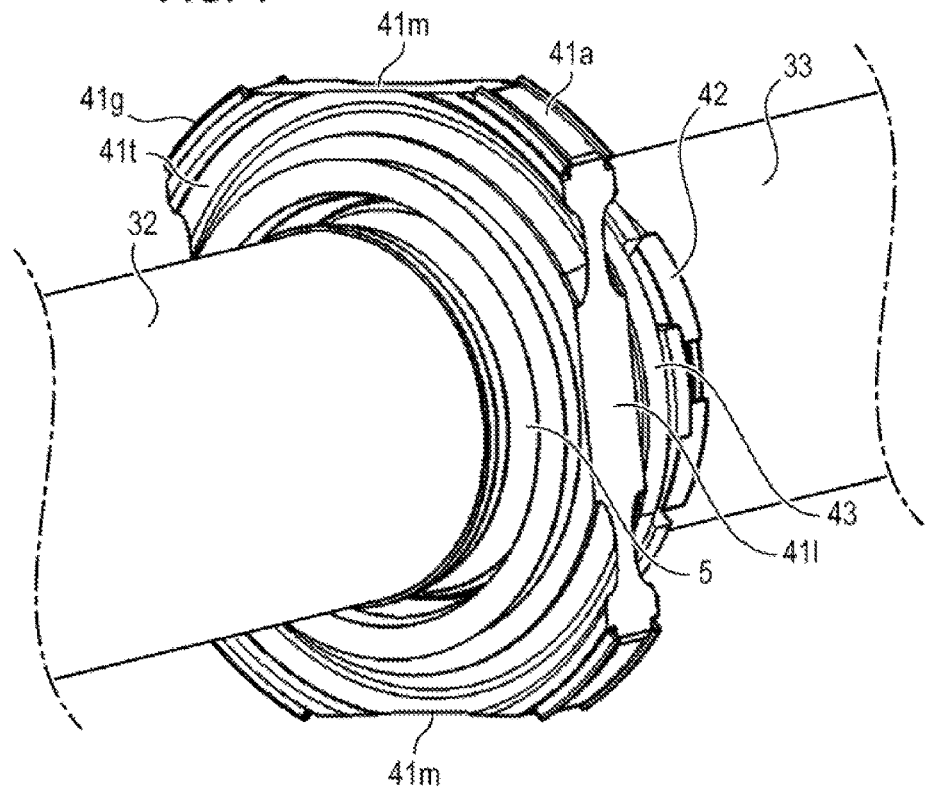
FIG. 4 shows a 3D isometric modeling of the support system assembled on the degassing pipe

With reference to FIG. 1, a turbojet T conforming to an embodiment of the invention includes, conventionally, a low-pressure compressor Cbp, a high-pressure compressor Chp, a combustion chamber Cc, a high-pressure turbine Thp, a low-pressure turbine Tbp and an exhaust nozzle Te.

The turbine shaft 2 extends along an axis A which is the overall axis of the turbojet T. The concepts of longitudinal and radial hereafter in the description will be relative to this axis A. The concepts of upstream and downstream hereafter in the description will be relative to the direction of flow of the fluids in the degassing pipe.

The turbine shaft 2 is hollow, and includes an inner wall 2a.

A degassing pipe 3 extends within the turbine shaft 2. Its function is to guide downstream the ventilation gas flow of the rolling element.

The degassing pipe 3 extends along the axis of the turbojet, concentrically with the turbine shaft 2. It is hollow and axially symmetrical, and includes a plurality of successive hollow segments; an upstream segment 31, a central segment 32 and a downstream segment 33.

The upstream segment 31 has a plurality of bores intended to allow the discharge of gasses in the degassing pipe, while the downstream segment 33 leads to a gas discharge outlet. These two upstream and downstream segments 31 and 33 have diameters which vary over their length. The central segment 32 between the two has, for its part, a constant diameter.

Assembly of the Segments

The upstream and downstream segments 31 and 33 are connected to the central segment 32 and blocked by tightening in the turbine shaft 2 by the assembly system 4 which is illustrated in FIGS. 2 and 3 in the case of the downstream segment 33.

With reference to FIG. 2, this assembly system 4 includes a part 41 forming a central support, a conical socket 42 and a nut 43.

The part 41 is a split annular part of the shaft support type. It has four outer lateral contact spans 41a. These spans 41a are distributed over four sides of the perimeter of said part 41 while being diametrically opposed, two by two.

The inner annular surface of the part 41 has an upstream conical portion 41b which flares from downstream to upstream. It terminates in a downstream cylindrical span 41c.

Said socket 42 has a cylindrical internal shape. Its external surface has, for its part, from upstream to downstream:
- a conical upstream portion 42a intended, during tightening, to cooperate in friction with the internal conical portion 41b of the part 41 forming a split support,
- a thread undercut 42g between the downstream end of the conical portion and the upstream end of a threaded portion 42b,
- a threaded portion 42b, which extends in the continuation of said conical portion 42a, intended to cooperate with a nut 43,
- a downstream end having notches 42d, intended to serve as an interface with a toothed rod 7 (detailed in FIG. 7 and in the assembly method) during the assembly phase of the support system 4.

The nut 43 has a threaded inner surface 43t intended to interact with the threaded portion 42b of the conical socket 42, and an upstream surface 431 which exerts a pressure against the downstream surface 411 of the split support 41 during tightening of the nut 43 on the conical socket 42.

With reference to FIG. 3, the segments 32 and 33 of the degassing pipe 3 are juxtaposed with a reinforced portion 5, supporting the force of the support system 4.

This reinforced portion 5 comprises, at its upstream 51 and downstream 53 ends, a short centering for the positioning of the segments 32 and 33 of the degassing pipe 3. The central portion 52 of the reinforced portion 5 has two axially symmetrical extra contact thicknesses 521 and 522, configured to reinforce the structure of the degassing pipe 3 at the location where the tightening force of the socket 42 caused by the extension of the split support 41 will be applied. Between these two extra thicknesses is inserted an O-ring seal 54.

The assembly of the support system 4 is therefore accomplished by insertion of the conical socket 42 into the split support 41 from upstream to downstream, until an axial abutment position is attained consequently to surface contact between the two parts. The nut 43 is then screwed to the threaded portion 42b of the conical socket 42 from downstream to upstream. Securing of the assembly is obtained during a configuration where the nut 43 provides a tightening force on the split support 41, thereby holding the latter in position axially and radially with respect to the conical socket 42.

Split Central Support

With reference to FIG. 4, the four contact spans 41a are separated two by two by two long flat surfaces 411 and two short flat surfaces 41m, which are diametrically symmetrical.

For the purpose of reducing rotating masses, the downstream and upstream surfaces of the support 41 each have an O-ring groove 41t.

Elastomer inserts 41g are distributed on either side of the contact spans 41a.

More precisely, an insert 41g is as a flat joint arch (ring with a rectangular cross-section), including two planar lateral surfaces, an inner surface with a radius of curvature smaller than the radius of curvature of the external surface, and two planar ends. Each edge has a bead, facilitating the different steps of assembly of the inserts 41g into the split support 41, then the support system 4 in the turbine shaft 2.

The elastomer inserts 41g may be assembled into dimples 41f (detailed in FIG. 5) made on either side of each contact span 41a.

The elastomer inserts 41g then have an external arc length slightly greater than that of the contact spans 41a for the purpose of covering the entire edge having an assembly risk.

The elastomer inserts 41g have a dimension in the radial direction configured so that they protrude in the radial direction from the contact spans 41g.

In this manner, the elastomer inserts 41g protrude in the radial direction and in the tangential direction from the contact spans 41a along which they are positioned.

In this manner, neither of the edges of the contact spans 41a may be put into contact with the turbine shaft during insertion of the support 41.

The fact of placing an insert 41g on either side of the contact spans 41a allows metal/metal contact to be prevented, both during insertion of the support 41 into the turbine shaft 2, and during disassembly of the support 41, for example during a maintenance or repair operation, the turbine shaft 2 being protected from contact with the support 41 regardless of the orientation of the support 41.

These inserts are for example made in a DMD5072 elastomer material identical with that of the O-ring seal 54.

Figure 5:
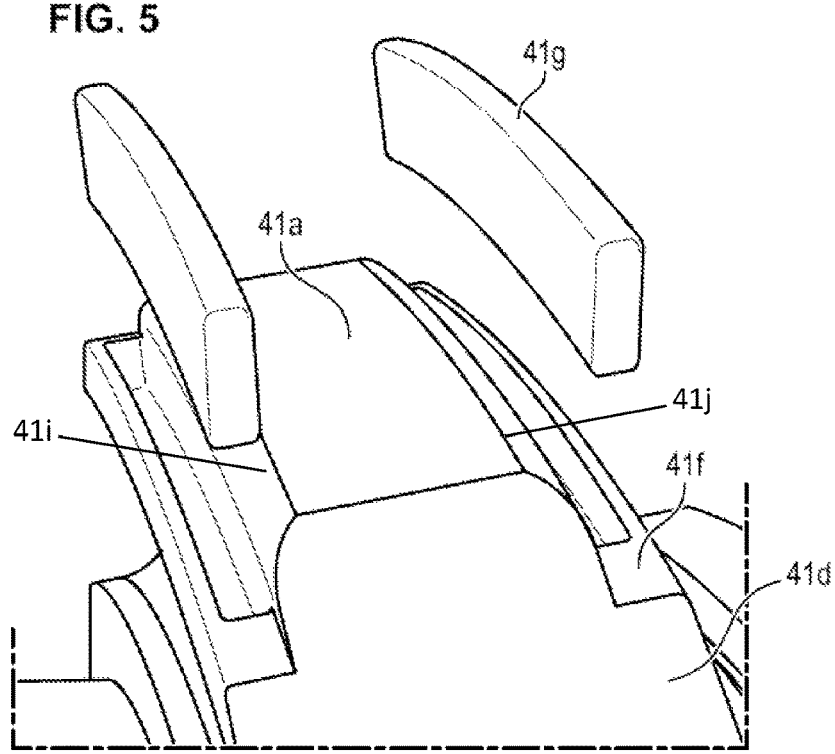
FIG. 5 shows a partial view of a 3D modeling of a split support centered on a contact span.

With reference to FIG. 5, the elastomer inserts 41g are assembled into dimples 41f machined in extra thicknesses 41d bordering the contact spans 41a.

More precisely, an elastomer insert 41g is situated along an upstream ridge 41i of a contact span 41a, another elastomer insert 41g being situated along a downstream ridge 41j of the contact span 41a.

The dimples 41f have a geometry similar to the elastomer inserts 41g, thereby comprising two planar lateral surfaces with a similar shape to the lateral surfaces of the inserts but with a smaller height, a curved bottom having a radius of curvature similar to the radius of curvature of the inner surface of one and two similar planar ends similar to those of the inserts.

The elastomer inserts 41g may be assembled glued into the dimples 41f to ensure that they are held in position during certain handling steps.

In another possible embodiment, the dimensions of the dimples 41f are less than the dimensions of the elastomer inserts 41g, so as to assemble the inserts by tightening to ensure they are held in position during certain handling steps.

Figure 6:
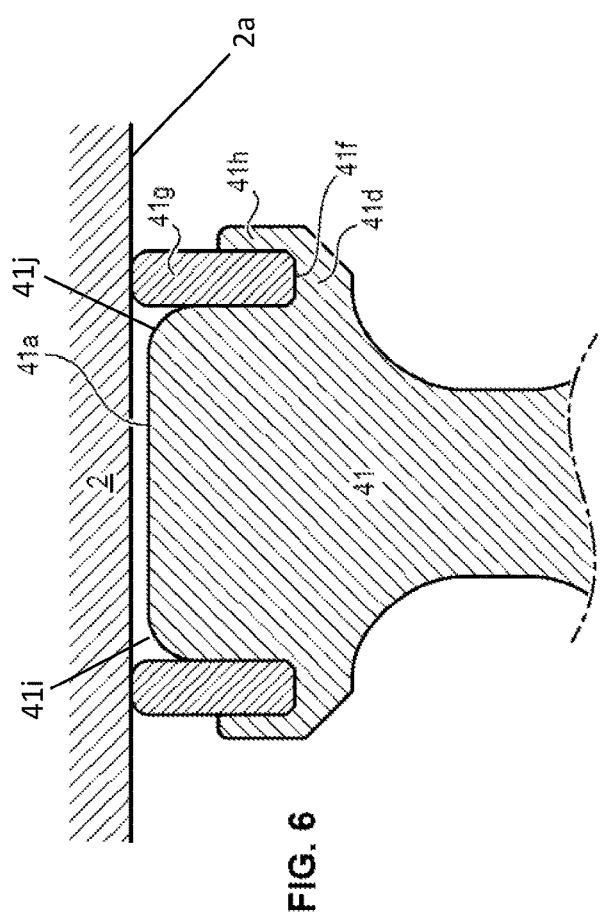
FIG. 6 shows a partial section view of a split support, centered on a contact span.

With reference to FIG. 6, the contact spans 41a have lateral extra thicknesses 41d in which dimples 41f intended to receive elastomer inserts 41g are machined. The lateral extra thicknesses have dimensions greater than those of the inserts.

The extra thicknesses are localized on either side of each contact span 41a and do not extend over the entire perimeter of the split support 41, for the purpose of limiting mass.

Considering the lateral extra thicknesses 41d tangent in their interior to a virtual cylinder, the radius of this cylinder is less than that of the cylinder tangent at its exterior to the contact spans 41a.

In the same manner, the dimpling outer edges 41h are tangent to a virtual cylinder having a radius less than the radius of the virtual cylinder tangent to the contact spans 41a.

The radius of the virtual cylinder tangent to the contact spans 41a is less than the inner radius of the turbine shaft 2, corresponding to an assembly step prior to the expansion of the split support 41. The radius of the dimpling outer edges 41h is less than the radius of the contact spans 41a to void generating an additional risk of deterioration of the turbine shaft 2 at the time of righting the support system 4. The geometry of the support 41 confers on it particular advantages within the scope of a shaft with a changing diameter, but the coupling of the degassing pipe in the shaft may be accomplished in the same manner if the inner diameter of the turbine shaft is constant, provided that it is greater than the diameter of the virtual cylinder tangent to the contact spans 41a (prior to expansion of the support 41).

Assembly

Figure 7:
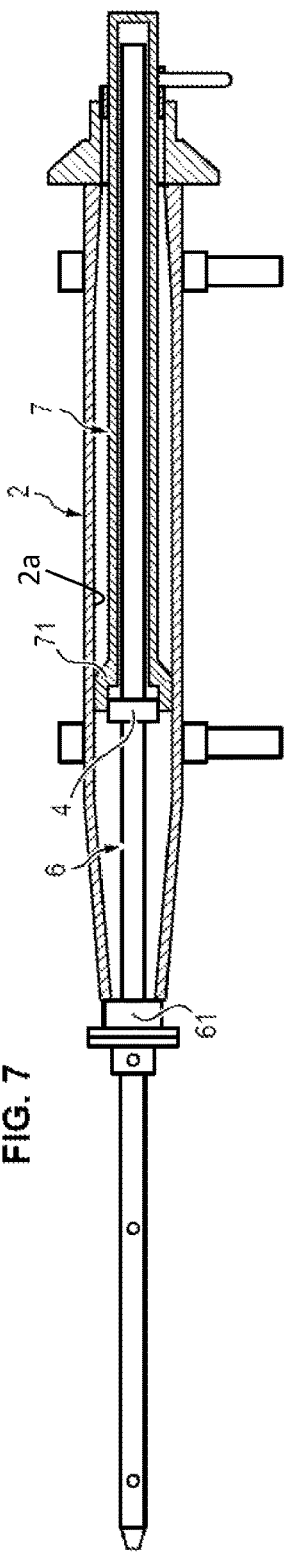
FIG. 7 shows a partial section view of the turbine shaft and the degassing pipe during assembly of a support system, as well as the tooling used.

With reference to FIG. 7, for the purpose of proceeding with the positioning of the support system 4, it is inserted into the turbine shaft 2 by its downstream end which has an inner diameter smaller than the inner diameter of its central portion. The width of the split support 41 at the long flat surfaces is therefore less than the minimum inner diameter of the turbine shaft 2, thereby allowing its insertion into the turbine shaft 2.

The support system 4 is then inserted into a support rod 6 designed for this application, inserted in its turn over the entire length of the turbine shaft from its upstream end. Said support rod 6 is equipped with a stop 61 to accomplish axial stopping against the upstream surface of the turbine shaft 2.

The support system 4 is then brought into position by sliding along said support rod 6, driven by means of a toothed rod 7 the teeth 71 whereof mate with the notches 42d of the conical socket 42 and thus ensure its tangential position. Said toothed rod 7 is hollow and has an inner diameter greater than the diameter of the support rod 6, allowing the toothed rod 7 to slide around the rod 6 during assembly of the support system 4.

The nut 43 is then screwed to the conical socket 42 thanks to the toothed rod 7, causing the righting, then the expansion of the split support 41 until it generates sufficient friction in contact with the turbine shaft 2 to ensure a complete connection with the latter.

These last two operations, during which the support system 4 is brought into position by sliding in the turbine shaft 2, then righted and expanded by tightening on the conical socket 42, no longer present a risk of deterioration of the inner surface of the turbine shaft 2, the elastomer inserts 41g now preventing metal/metal contact and eliminating any risk of deterioration linked to this phenomenon. Operations may thus be carried out more rapidly and more safely.

The upstream reinforced portion 5 is then inserted into the upstream support 4, before screwing the nut 43 on the conical socket 42 and generating a tightening force securing the reinforced portion 5 and the turbine shaft 2. The central segment of the degassing pipe 32 is then inserted, followed by the downstream support system using the same method as the upstream support system.

The invention claimed is:

1. A support providing a complete connection between a degassing pipe and a turbine shaft, said support including a plurality of outer contact spans intended to bear on an inner wall of the turbine shaft to secure the degassing pipe with respect thereto, characterized in that the different spans are each bordered by at least one elastomer insert which contributes to the protection of the turbine shaft during insertion of the support therein, and in that the elastomer inserts protrude with respect to the contact spans along which they are positioned so as to prevent metal/metal contact between the turbine shaft and the contact spans during insertion of said support.

2. The support according to claim 1, characterized in that it includes a plurality of lateral extra thicknesses which extend on either side of the outer contact spans and at which are disposed the elastomer inserts.

3. The support according to claim 2, characterized in that it includes a plurality of dimples formed in the lateral extra thicknesses, said dimples receiving the elastomer inserts.

4. The support according to claim 3, characterized in that, the contact spans extending tangentially to a first virtual cylinder, the outer edges of the dimples extend along a second virtual cylinder concentric with the first and with a smaller radius.

5. The support according to claim 3, characterized in that the elastomer inserts are assembled glued into the dimples.

6. The support according to claim 3, characterized in that the elastomer inserts are assembled tightly into the dimples.

7. The support according to claim 1, wherein the elastomer inserts protrude radially and tangentially with respect to the contact spans along which they are positioned.

8. A support system providing a complete connection between a degassing pipe and a turbine shaft, said support system comprising a support as defined in claim 1, a nut intended to exert an axial thrust force on said support by screwing onto a threaded portion of a conical socket, said conical socket having a conical portion intended to transform the axial thrust into radial expansion of said support.

9. A degassing pipe and turbine shaft assembly secured thanks to a support system including a support as defined in claim 1.

10. A turbine engine including a degassing pipe and turbine shaft assembly secured by a support system including a support as defined in claim 1.

11. A turbine engine including a shaft with a changing inner diameter secured to a concentric inner part that is cylindrical overall thanks to a support system including a support as defined in claim 1.

\* \* \* \* \*